United States Patent
Files et al.

(10) Patent No.: US 11,480,207 B2
(45) Date of Patent: Oct. 25, 2022

(54) ASSEMBLY TO CONNECT A PANEL TO A SUPPORT MEMBER

(71) Applicant: The Boeing Company, Chicago, IL (US)

(72) Inventors: Joe Files, Arlington, WA (US); Jeffrey Allen Cartwright, Arlington, WA (US); Adam Arthur Logue, Everett, WA (US); Robert B. Fowler, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 69 days.

(21) Appl. No.: 16/778,712

(22) Filed: Jan. 31, 2020

(65) Prior Publication Data
US 2021/0237902 A1   Aug. 5, 2021

(51) Int. Cl.
*B64C 1/10* (2006.01)
*F16B 9/00* (2006.01)
(Continued)

(52) U.S. Cl.
CPC ............. *F16B 9/05* (2018.08); *B64C 1/066* (2013.01); *B64C 1/10* (2013.01); *F16B 9/02* (2013.01);
(Continued)

(58) Field of Classification Search
CPC .. B64C 1/00; B64C 1/06; B64C 1/064; B64C 1/066; B64C 1/10; B64C 2001/0054; F16B 5/01; F16B 7/044; F16B 7/0493; F16B 9/02; F16B 9/05; F16B 9/056; F16B 12/10; F16B 12/12; F16B 12/20; F16B 12/32;
(Continued)

(56) References Cited

U.S. PATENT DOCUMENTS 2,700,172 A * 1/1955 Rohe ..................... F16B 43/00
                                                      16/2.1
4,902,180 A * 2/1990 Gauron .................. B29C 65/42
                                                      411/258
(Continued)

FOREIGN PATENT DOCUMENTS

EP         1302680 A2    4/2003
WO     2011085993 A1     7/2011

OTHER PUBLICATIONS

EP Search Report dated Jun. 25, 2021 in re EP Application No. 21153862.4.

*Primary Examiner* — Michael P Ferguson
(74) *Attorney, Agent, or Firm* — Coats & Bennett, PLLC (57) ABSTRACT

An assembly to connect a panel to a support member. The assembly may include a saddle fitting configured to connect to the support member and including first and second plates. A back fitting may be positioned between the second plate of the saddle fitting and a second face of the panel. An index fitting includes a flange that may be positioned between the first plate of the saddle fitting and a first face of the panel, and a boss that extends outward from the flange and through the opening in the panel. The index fitting is wider than the panel and sized to fit within the gap of the saddle fitting with a first end of the index fitting contacting against the first plate and a second end of the index fitting contacting against the second plate. One or more fasteners may connect the saddle fitting to the index fitting.

19 Claims, 9 Drawing Sheets

(51) Int. Cl.
*F16B 9/02* (2006.01)
*B64C 1/06* (2006.01)

(52) U.S. Cl.
CPC ...... *Y10T 403/347* (2015.01); *Y10T 403/7105* (2015.01); *Y10T 403/7194* (2015.01)

(58) Field of Classification Search
CPC ............. Y10T 403/342; Y10T 403/347; Y10T 403/7105; Y10T 403/7182; Y10T 403/7188; Y10T 403/7194; E04B 2002/7461; E04B 2002/7474
See application file for complete search history.

(56) References Cited

U.S. PATENT DOCUMENTS

| | | | |
|---|---|---|---|
| 5,093,957 A * | 3/1992 | Do | E04C 2/365 |
| | | | 16/2.1 |
| 7,416,362 B2 * | 8/2008 | North | F16B 5/0241 |
| | | | 267/150 |
| 8,556,531 B1 * | 10/2013 | Bird | F16F 15/04 |
| | | | 403/28 |
| 10,353,272 B2 | 7/2019 | Yowler et al. | |
| 10,399,658 B2 | 9/2019 | Von-Wilmowsky et al. | |
| 11,073,173 B2 * | 7/2021 | Knorr | F16B 5/01 |
| 2017/0291675 A1 * | 10/2017 | Nandalochana | B64D 11/04 |

* cited by examiner

ASSEMBLY TO CONNECT A PANEL TO A SUPPORT MEMBER

TECHNOLOGICAL FIELD

The present disclosure relates generally to assemblies for attaching a panel to a support and, more particularly, to assemblies that securely support a panel and accommodate variations in panel thicknesses.

BACKGROUND

There are many applications for attaching panels to a support structure. Examples include both interior and exterior applications. One specific example includes attaching panels within an aircraft cabin to a structural frame. The panels then form a secondary support structure for interior walls within the cabin.

Current designs include plates that are positioned on opposing sides of the panel. The plates include openings that align with openings in the panel. Fasteners extend through the panel and the plates to connect to a support structure. These designs lack orientation and locking features to properly align the plates on the opposing sides of the panels. This results in a time-consuming build that may also require intricate dimensioning and special tooling to create the components.

Another issue with the current designs is the inability to accommodate for varying panel thicknesses. Fit-up on different constructs can vary with some constructs being loose while others are tight requiring a tool to complete the fastener insertion. These variations can lead to the panels being misaligned when attached to the support structure. These variations can also lead to the panels being inadvertently movable relative to the support structure.

Attachment of the panel to the support structure can also include application of an adhesive. The adhesive is applied to bond the plates to the panel. An issue with the current design is the adhesive tends to migrate into the mounting holes that extend through the panel. This requires cleaning of the holes or otherwise reaming the holes to ensure they are open and able to receive a fastener.

SUMMARY

One aspect is directed to an assembly to connect a panel to a support member. The assembly comprises a saddle fitting that extends from the support member. The saddle fitting comprises first and second plates that are spaced apart by a gap that receives the panel. An index fitting is configured to engage with an opening in the panel. The index fitting comprises a flange with an inner side configured to contact against a first face of the panel at the opening, and with the flange also including an opposing outer side. The index fitting also comprises a boss that extends outward from the inner side of the flange and is sized to fit within the opening in the panel. The boss comprises a face at an end away from the flange. The assembly also comprises a back fitting with an inner side configured to contact against a second face of the panel at the opening. The back fitting comprises an opening that aligns with the opening in the panel. The assembly comprises one or more fasteners that extend through the boss and connects the saddle fitting to the index fitting. The index fitting is sized for the boss to extend through the opening in the panel and the opening in the back fitting with the inner side of the flange in contact against the first side of the panel. The index fitting is further sized to fit within the gap in the saddle fitting with the outer side of the flange in contact with the first plate and the face of the boss in contact with the second plate.

In another aspect, the boss comprises a non-circular sectional shape with a larger major axis and a smaller minor axis and with the major axis being perpendicular to the minor axis.

In another aspect, the face of the boss lies within a first plane and the inner side of the flange lies in a second plane with the first plane parallel to the second plane.

In another aspect, the flange and the back fitting are both bonded to the panel with an adhesive.

In another aspect, the flange extends completely around the boss.

In another aspect, the saddle fitting further comprises a body that forms a channel that receives the support member with the body further comprising one or more openings configured to receive fasteners to attach the saddle fitting to the support member.

In another aspect, an outer side of the back fitting is spaced away from the second plate of the saddle fitting.

In another aspect, the flange comprises a cut-out along an outer edge with the cut-out sized to receive a fastener to orient the index fitting relative to the opening in the panel.

One aspect is directed to an assembly to connect a panel to a support member. The assembly comprises a saddle fitting connected to the support member with the saddle fitting comprising first and second plates that are spaced apart by a gap that receives the panel. A back fitting is positioned between the second plate of the saddle fitting and a second face of the panel with the back fitting shaped to extend around an opening in the panel. An index fitting comprises a flange positioned between the first plate of the saddle fitting and a first face of the panel. The index fitting comprises a boss that extends outward from the flange and through the opening in the panel. The boss comprises a face positioned outward beyond the second face of the panel. The index fitting is wider than the panel and sized to fit within the gap of the saddle fitting with a first end of the index fitting contacting against the first plate of the saddle fitting and a second end of the index fitting contacting against the second plate of the saddle fitting. The assembly also comprises one or more fasteners that connect the saddle fitting to the index fitting.

In another aspect, the saddle fitting is configured to be attached to the support member and comprises one or more openings to receive one or more fasteners.

In another aspect, the backing fitting is connected to the second face of the panel with an adhesive.

In another aspect, the flange of the index fitting is connected to the first face of the panel.

In another aspect, the fasteners comprise quick release pins with a head, an elongated shaft, and a spring loaded member that extends from the shaft.

In another aspect, one or more openings extend through the boss and the flange of the index fitting with each of the one or more openings configured to receive one of the fasteners to connect the saddle fitting to the index fitting.

In another aspect, the first end of the index fitting is formed on an outer side of the flange that faces away from the first face of the panel and the second end of the index fitting is formed on the face of the boss.

In another aspect, the face of the boss is positioned farther outward away from the second face of the panel than an outer side of the back fitting.

In another aspect, the boss comprises an elongated sectional shape with a major axis that is larger than and perpendicular to a smaller minor axis.

One aspect is directed to a method of attaching a panel to a support member. The method comprises: inserting an index fitting through an opening in the panel; positioning a first end of the index fitting outward from a first face of the panel and a second end of the index fitting outward from a second face of the panel; contacting the index fitting against a back fitting that is connected to the second face of the panel; inserting the panel, the index fitting, and the back fitting into a gap of a saddle fitting that extends from the support member; and inserting one or more fasteners through the saddle fitting and the index fitting and connecting the panel to the support member.

In another aspect, the method comprises bonding a flange of the index fitting to the first face of the panel and bonding the back fitting to the second face of the panel.

In another aspect, the method comprises preventing the index fitting from rotating within the opening in the panel.

In another aspect, the method comprises positioning a top edge of the panel within the gap of the saddle fitting and positioning a bottom edge of the panel away from the saddle fitting.

In another aspect, the method comprises contacting the first and second ends of the index fitting against the saddle fitting and spacing the saddle fitting away from the back fitting.

The features, functions and advantages that have been discussed can be achieved independently in various aspects or may be combined in yet other aspects, further details of which can be seen with reference to the following description and the drawings.

DETAILED DESCRIPTION

Figure 1:
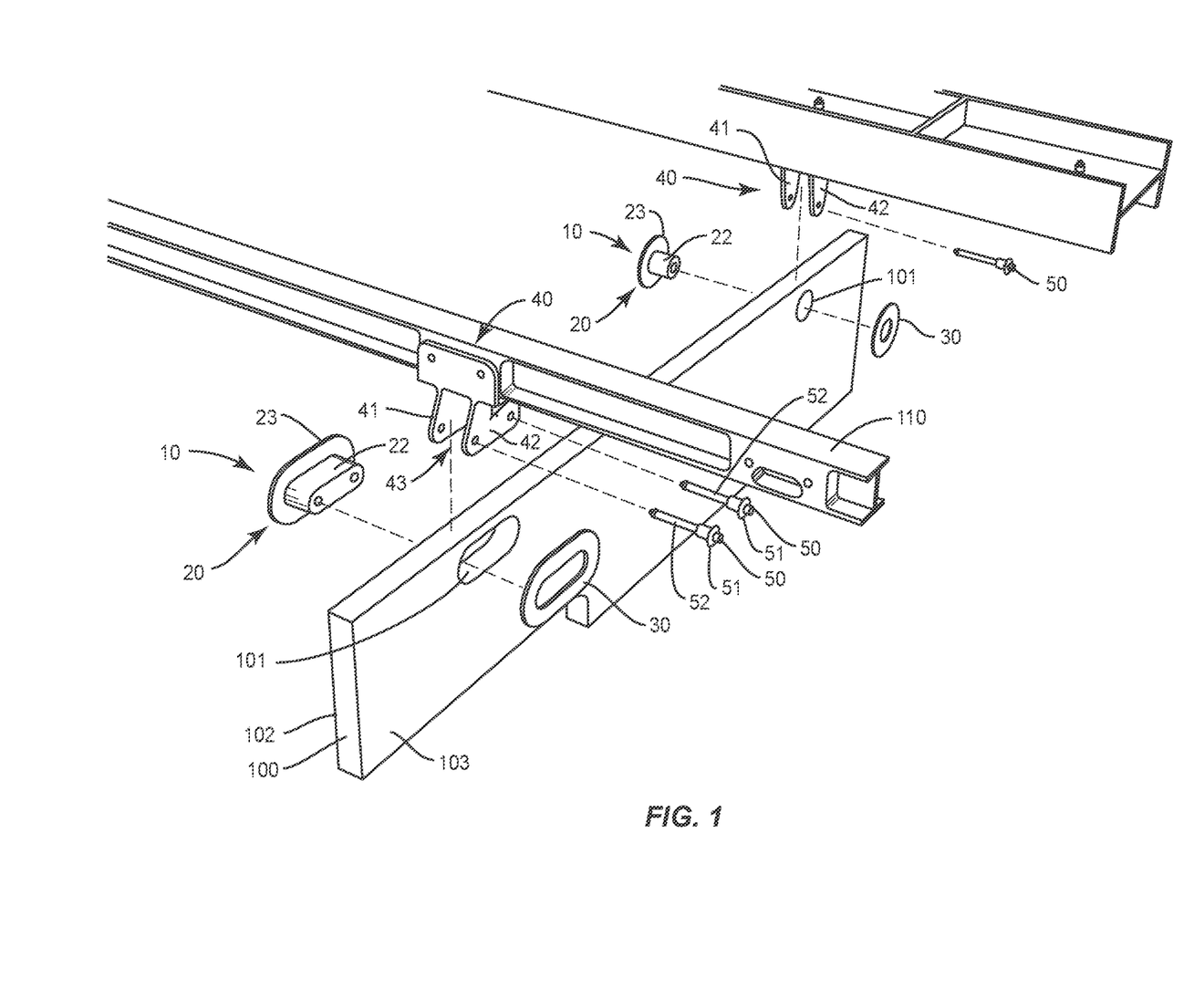
FIG. 1 an exploded perspective view of assemblies that attach a panel to support members.

FIG. 1 illustrates an exploded view of assemblies 10 that connect a panel 100 to a support member 110. Each assembly 10 includes an index fitting 20 that engages within an opening 101 in the panel 100. The index fitting 20 includes a boss 22 sized to fit within the opening 101 and a flange 23 that contacts against a first face 102 of the panel 100. A back fitting 30 is positioned at a second face 103 of the panel 100. A saddle fitting 40 is positioned on the support member 110. The saddle fitting 40 includes first and second plates 41, 42 that are spaced apart by a gap 43. The index fitting 20, back fitting 30, and panel 100 are sized to fit within the gap 43 with the indexing fitting 20 contacting against the first and second plates 41, 42. One or more fasteners 50 connect the panel 100 to the support member 110.

Figure 2:
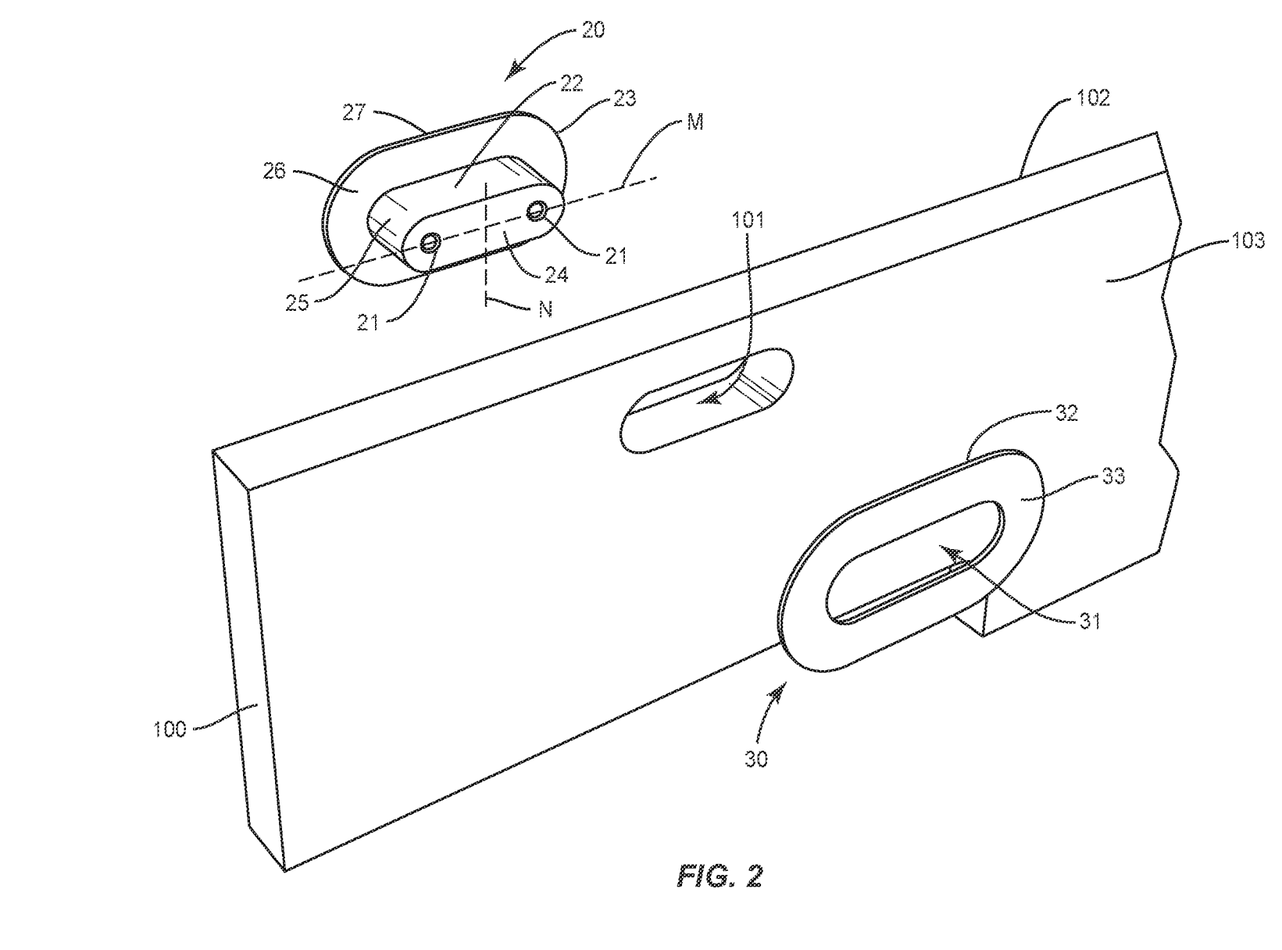
FIG. 2 is an exploded perspective view of an index fitting and a back fitting positioned at an opening in a panel.
Figure 3:
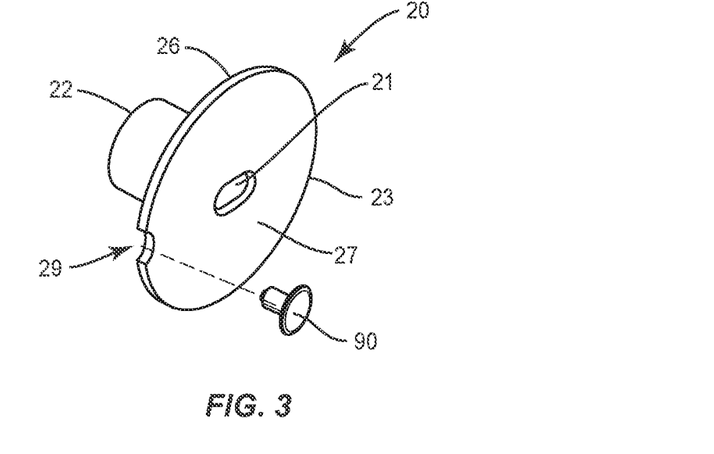
FIG. 3 is perspective view of an index fitting and a fastener that orients the index fitting relative to the panel.
Figure 4:
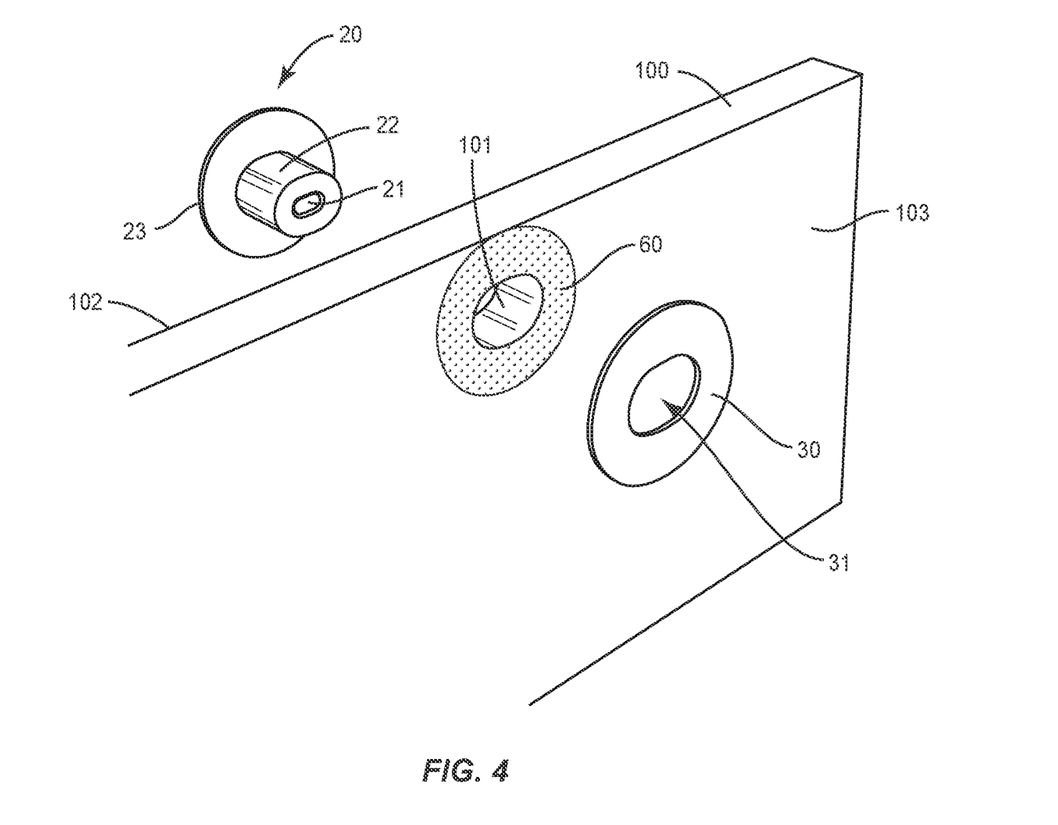
FIG. 4 is an exploded perspective view of an index fitting and a back fitting positioned at an opening in a panel.

As illustrated in FIG. 2, the indexing fitting 20 is configured to be inserted into the opening 101 in the panel 100 on the first face 102. The index fitting 20 includes a boss 22 that extends outward from a flange 23. The boss 22 includes sidewalls 25 and a face 24. In one example, the face 24 is flat and lies within a first plane and an inner side 26 of the flange 23 is flat and lies within a second plane. The first plane and the second plane are parallel. The boss 22 has a sectional shape that substantially matches the shape of the opening 101 in the panel 100. In the example of FIG. 2, the boss 22 has an oblong sectional shape with a major axis M and a minor axis N. The axes M, N are perpendicular to each other and the major axis M is larger than the minor axis N. The elongated sectional shape of the boss 22 matches the shape of the opening 101 and prevents rotation of the indexing fitting 20 relative to the panel 100. The boss 22 can include a variety of different sectional shapes, including but not limited to oval and polygonal. FIG. 3 includes a boss 22 with a circular sectional shape. To prevent rotation, the flange 23 includes a cut-out 29 along an outer edge. The cut-out 29 is sized to receive a fastener 90 that mounts to the panel 100. The cut-out 29 and fastener 90 function to position the indexing fitting 20 at a fixed orientation relative to the panel 100. FIG. 4 includes a boss 22 with a smaller oblong shape than the boss 22 of FIG. 2.

The flange 23 of the indexing fitting 20 is larger than the opening 101 in the panel 100. This sizing maintains the boss 22 within the opening 101 and prevents the indexing fitting 20 from being pushed through the opening 101. The flange 23 includes an inner side 26 and an outer side 27. The inner side 26 is flat to contact against the first face 102 of the panel 100 when the boss 22 is positioned in the opening 101. In one example, the flange 23 extends completely around the boss 22 to contact against the panel 100 at points around the opening 101. In another example, the flange 23 is discontinuous and does not extend completely around the boss 22.

One or more openings 21 extend through the boss 22 and flange 23. Each of the openings 21 is sized to receive a fastener 50. FIG. 2 includes an example with a pair of openings 21. FIGS. 3 and 4 include examples with a single opening 21.

The back fitting 30 is positioned on the second face 103 of the panel 100. The back fitting 30 is positioned at the opening 101 to contact and support the boss 22. The back fitting 30 can extend completely around the opening 101, or can extend partially around the opening 101. In one example as illustrated in FIG. 2, the back fitting 30 has an annular shape with a central opening 31. The opening 31 is sized and shaped to match the opening 101 in the panel 100. The back fitting 30 has a substantially a thin, flat shape with an inner side 32 that contacts against the panel 100 and an outer side 33 faces away from the panel 100. The inner side 32 is flat to facilitate contact with the second face 103 of the panel 100.

The saddle fitting 40 extends from the support member 110 to engage with the index fitting 20. In one example, the saddle fitting 40 is a separate piece that is connected to the support member 110 with one or more fasteners. In another example, the saddle fitting 40 is integral with the support member 110 and having a one-piece unitary construction.

An adhesive 60 can secure one or more of the index fitting 20 and back fitting 30 to the panel 100. In one example as illustrated in FIG. 4, the adhesive 60 can extend completely around the opening 101 on one or both of the first and second faces 102, 103 of the panel 100. Other examples can include the adhesive 60 positioned along one or more limited sections of the opening 101. In use, the adhesive 60 bonds the inner side 26 of the flange 23 of the index fitting 20 to the first face 102 of the panel 100 and the inner side 32 of the back fitting 30 to the second face 103 of the panel 100. This bonding provides for carrying a shear load through the faces 102, 103 of the panel 100. In other examples, the index fitting 20 and back fitting 30 are not bonded to the panel 100.

Figure 5:
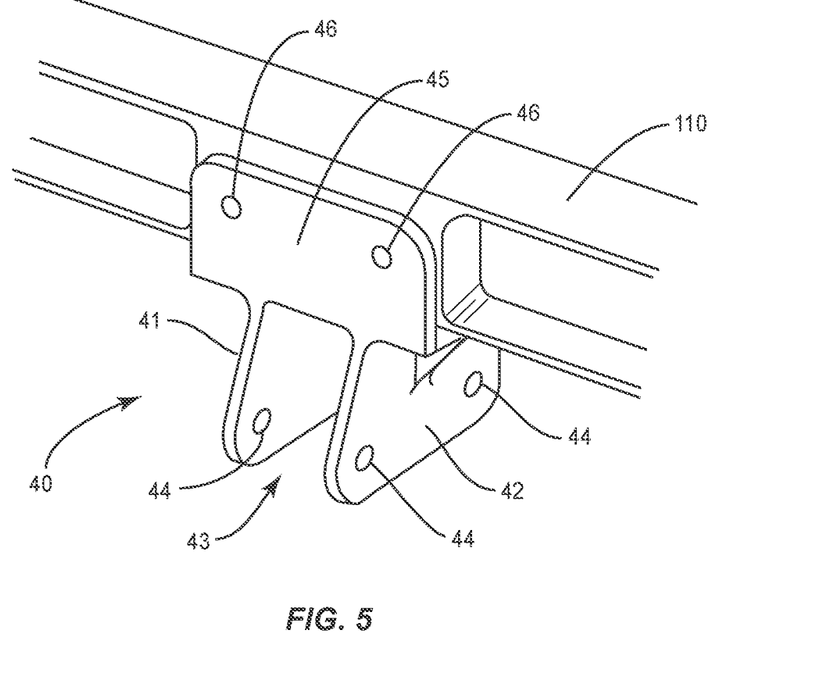
FIG. 5 is a perspective view of a saddle fitting connected to a support member.

As illustrated in FIG. 5, the saddle fitting 40 includes first and second plates 41, 42 that are separate by a gap 43. One or more openings 44 extend through the first and second plates 41, 42 to receive the fasteners 50. A body 45 extends between and connects to the first and second plates 41, 42. The body 45 is configured to engage with the support member 110. In one example as illustrated in FIG. 5, the body 45 includes a C-shape cavity that receives the support member 110. One or more fasteners 46 extend through and connect the body 45 to the support member 110.

Fasteners 50 connect the panels 100 to the support members 110. The fasteners 50 include an elongated length to extend through the saddle fitting 40, assembly 10, and panel 100. In one example, fasteners 50 are quick release pins as illustrated in FIG. 1. The fasteners 50 include a head 51 and an elongated shaft 52. A spring loaded pin extends outward from the shaft 52. In another example, the fasteners 50 include an elongated nut with a threaded end configured to receive a nut.

Figure 6:
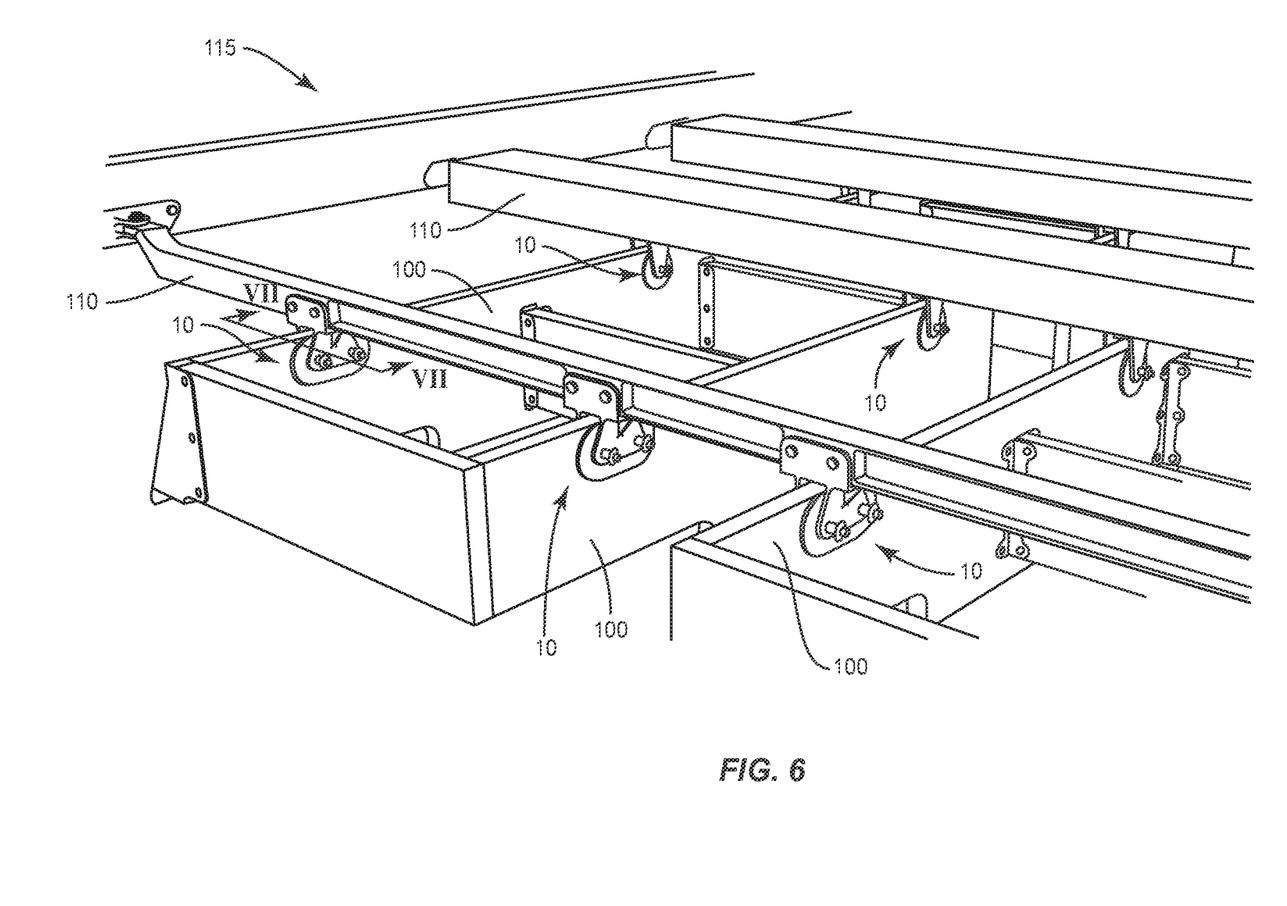
FIG. 6 is a perspective view of a system of assemblies that connect panels to support members.

FIG. 6 illustrates a system 115 with a number of different assemblies 10 that connect panels 100 to support members 110. The panels 100 can be used to construct a variety of different structures. One example includes the panels 100 being positioned within the interior of an aircraft. Another example includes the panels 100 forming walls within an interior of a building. In one example as illustrated in FIG. 6, each panel 100 includes two or more assemblies 10. A first assembly 10 includes a boss 22 with an oblong sectional shape that is inserted into an oblong opening 101. A second assembly 10 includes a boss 22 with a circular section shape that is inserted into a circular opening 101. The first assembly 10 with the oblong boss 22 is referred to as a locating connector as it locates the position panel 100 relative to the support member 110. The second assembly 10 with the circular boss 22 is a floating connector and further supports the connection of the panel 100 to the support members 110. The assemblies 10 are spaced apart along the panel 100. The assemblies 10 can be connected to the same or different support members 110.

Figure 7:
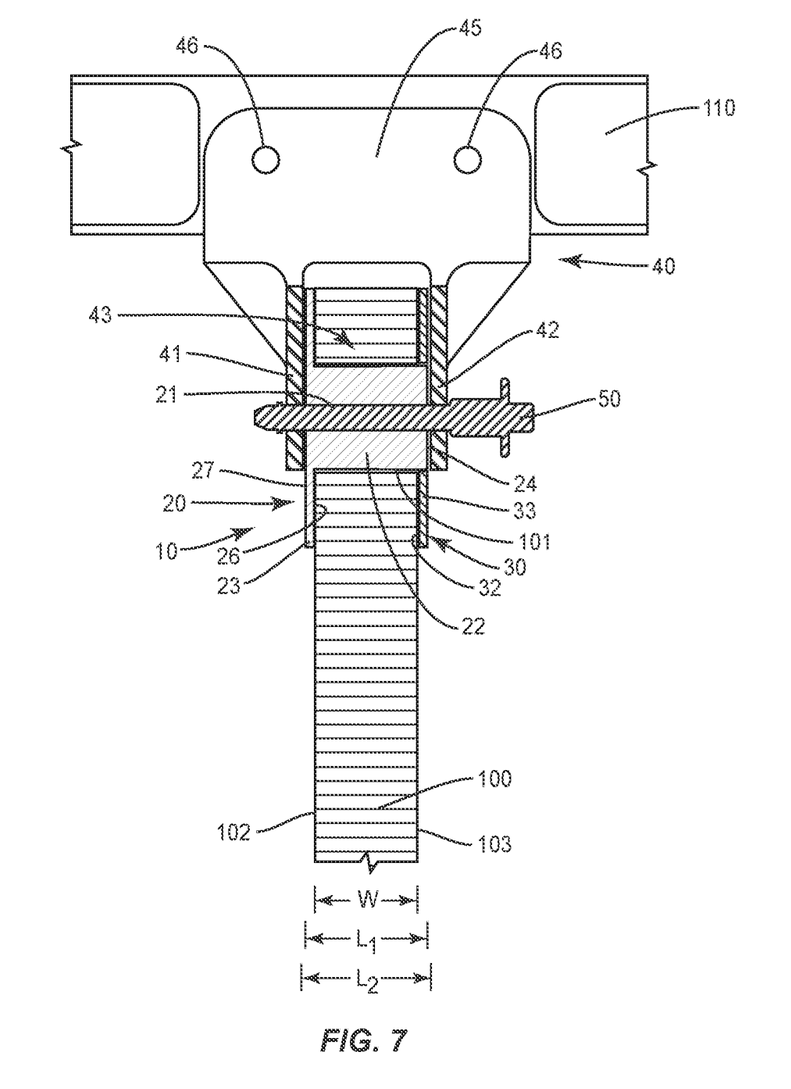
FIG. 7 is a section view cut along line VII-VII of FIG. 6.

FIG. 7 illustrates an assembly 10 that connects a panel 100 to a support member 110. The indexing fitting 20 is positioned with the boss 22 extending through the opening 101 in the panel 100. The boss 22 includes a length L1 measured between the inner side 26 of the flange 23 and the face 24. The length L1 is greater than a width W of the panel 100. This sizing provides for the inner side 26 to contact against the first face 102 of the panel 100 and the face 24 to be positioned outward beyond the second face 103 of the panel 100. The back fitting 30 is positioned at the second face 103 of the panel 100. The face 24 of the boss 22 extends outward farther than the outer side 33 of the back fitting 30. In one example, a gap is formed between the second plate 42 and the outer side 33 of the back fitting 30.

When the index fitting 20 is inserted into the opening 101, the inner side 26 of the flange 23 contacts against the first face 102 of the panel. The boss 22 is sized to extend outward beyond the second face 103 of the panel 100. The boss 22 extends outward beyond the second face 103 and amount that is greater than a thickness of the back fitting 30 that is measured between the inner and outer sides 32, 33. This sizing results in the face 24 of the boss 22 contacting against the second plate 42 of the saddle fitting 40. The back fitting 30 does not interfere with this contact.

The size of the index fitting 20 provides for each of the ends to extend outward beyond the faces 102, 103 of the panel 100. This also reduces or prevents the adhesive 60 from migrating into the one or more openings 21.

The panel 100, index fitting 20, and back fitting 30 are sized to fit within the gap 43 of the saddle fitting 40. The outer side 27 of the flange 23 contacts against the first plate 41 and the face 24 contacts against the second plate 42. That is, the index fitting 20 includes a length L2 measured between the outer side 27 of the flange 23 and the face 24. This length L2 is less than or equal to a width of the gap 43. The saddle fitting 40 engages just the index fitting 20. This engagement eliminates variations in the connections due to panel thickness variations and stack-up tolerances.

The boss 22 protrudes through and extends outward beyond the back fitting 30. This positioning provides for the boss 22 to contact against and be supported by the back fitting 30. In one example, the flange 23 of the index fitting 20 and the back fitting 30 are bonded to the panel 100 with an adhesive 60. With the boss 22 contacting with the saddle fitting 40, shear loads on the panel 100 are carried through the first and second faces 102, 103. In another example, the flange 23 and/or the back fitting 30 are positioned against the panel 100 but are not bonded to the panel 100.

The assemblies 10 can support a variety of different panels 100. One example is a honeycomb core composite sandwich panel 100 that includes a low density interior honeycomb core with high-rigidity outer sheets that form the first and second faces 102, 103. Other examples include panels 100 constructed from various materials including but are not limited to wood, plastic, metal, and combinations thereof. The various panels 100 can include various shapes and sizes. In one example, the panels 100 are CNC-machined to accommodate various configurations. The various configurations can provide unique ceiling attachment points, load paths, and system interfaces.

Figure 8:
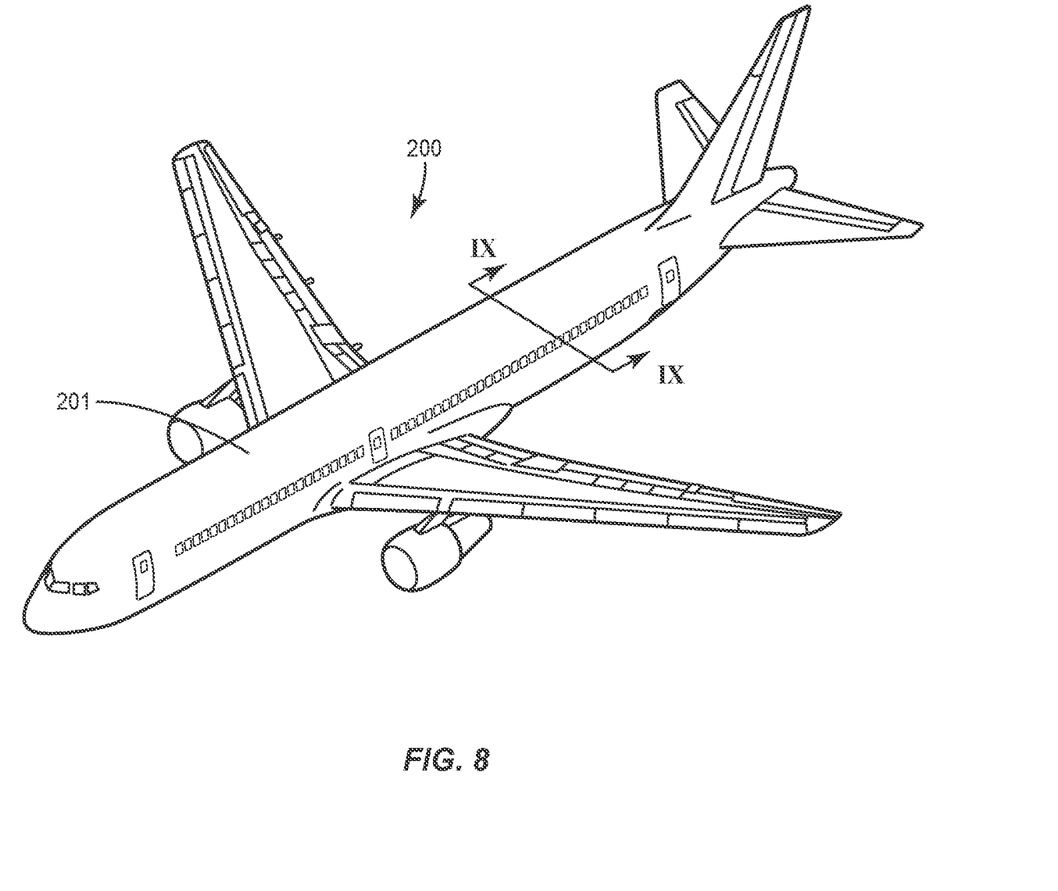
FIG. 8 is a perspective view of an aircraft.
Figure 9:
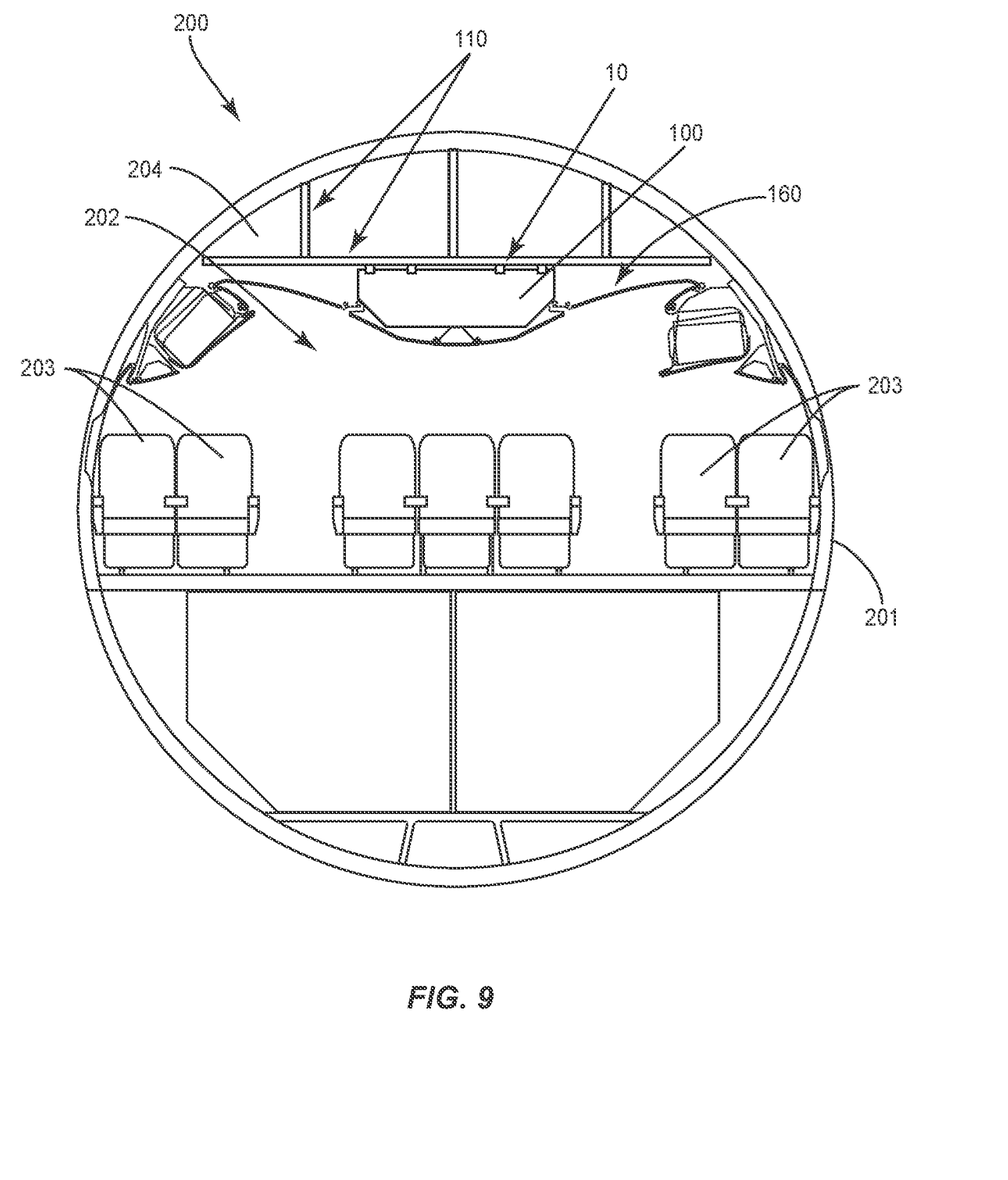
FIG. 9 is a section view cut along line IX-IX of FIG. 8.

One application for the assemblies 10 is to support structural members within an interior of an aircraft. FIG. 8 illustrates an aircraft 200 with a fuselage 201 that forms a cabin area for transporting passengers and a crown area for housing systems and supports. As illustrated in FIG. 9, the cabin area 202 includes rows of seats 203 to accommodate the passengers. The crown area 204 contains the panels 100 which are attached to support members 110. Interior linings 160 are attached to the panels 100 to form a boundary between the cabin area 202 and crown area 204. The interior linings 160 can further be configured to form various other features within the cabin area 202.

Figure 10:
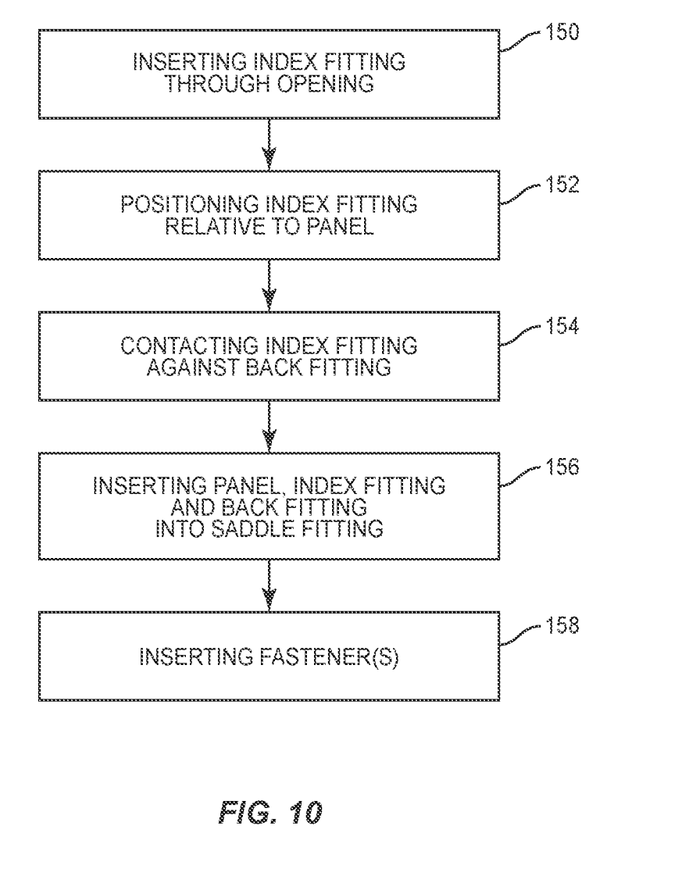
FIG. 10 is a flowchart diagram of a method of attaching a panel to a support member.

FIG. 10 illustrated a method of attaching a panel 100 to a support member 110. The method includes inserting an indexing fitting 20 through an opening 101 in the panel 100 (block 150). This includes positioning the boss 22 through the opening 101. The boss 22 includes a sectional shape and size that matches the opening 101. A first end of the indexing fitting 20 is positioned outward from a first face 102 of the panel 100 and a second end is positioned outward from a second side 102 of the panel 100 (block 152). The first end of the index fitting 20 includes the outer side 27 of the flange 23 and the second end of the index fitting 20 includes the face 24 of the boss 22. The index fitting 20 contacts against a back fitting 30 that is connected to the second face 103 of the panel 100 (block 154). This includes the sidewall 25 of the boss 22 contacting against the edge of the back fitting 30 formed at the opening 31. The panel 100, the indexing fitting 20, and the back fitting 30 are inserted into a gap 43 of the saddle fitting 40 that extends from the support member 110 (block 156). Once positioned in the gap 43, one or more fasteners 50 are inserted through the saddle fitting 40, the indexing fitting 20, and the back fitting 30 to connect the panel 100 to the support member 110 (block 158).

One or more additional assemblies 10 can support and position the panel 100. These additional assemblies 10 can attached to the support members 110 in a similar manner.

The index fitting 20, back fitting 30, and saddle fitting 40 can be constructed from a variety of materials, including but not limited to plastics and metals. These elements can be constructed from the same or different materials.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention can be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An assembly connecting a panel to a support member, the assembly comprising:
    a saddle fitting that extends from the support member, the saddle fitting comprising first and second plates that are spaced apart by a gap that receives the panel;
    an index fitting configured to engage with an opening in the panel, the index fitting comprising:
    a flange with an inner side and an opposing outer side, the inner side configured to contact against a first face of the panel at the opening;
    a boss that extends outward from the inner side of the flange and is sized to fit within the opening in the panel, the boss comprising a face at an end away from the flange;
    a back fitting with an inner side configured to contact against a second face of the panel at the opening, the back fitting further comprising an opening that aligns with the opening in the panel; and
    the index fitting sized for the boss to extend through the opening in the panel and the opening in the back fitting with the inner side of the flange in contact against the first face of the panel, the index fitting further sized to fit within the gap in the saddle fitting with the outer side of the flange in contact with the first plate and the face of the boss in contact with the second plate;
    wherein the saddle fitting further comprises a body that forms a channel that receives the support member, the first and second plates extending from the body, and the body further comprising one or more openings configured to receive one or more support member fasteners to attach the saddle fitting to the support member.

2. The assembly of claim 1, wherein the boss comprises a non-circular sectional shape with a larger major axis and a smaller minor axis and with the major axis being perpendicular to the minor axis.

3. The assembly of claim 1, wherein the face of the boss lies within a first plane and the inner side of the flange lies in a second plane with the first plane parallel to the second plane.

4. The assembly of claim 1, wherein the flange and the back fitting are both bonded to the panel with an adhesive.

5. The assembly of claim 1, wherein an outer side of the back fitting is spaced away from the second plate of the saddle fitting.

6. The assembly of claim 1, wherein the flange further comprises a cut-out along an outer edge, the cut-out sized to receive a fastener to orient the index fitting relative to the opening in the panel.

7. A method of attaching the panel to the support member of the assembly of claim 1, the method comprising:
    inserting the index fitting through the opening in the panel;
    positioning the outer side of the flange of the index fitting outward from the first face of the panel and the face of the boss of the index fitting positioned outward from the second face of the panel;
    contacting the index fitting against the back fitting that is connected to the second face of the panel;
    inserting the panel, the index fitting, and the back fitting into the gap of the saddle fitting that extends from the support member;
    inserting one or more fasteners through the saddle fitting and the index fitting and connecting the panel to the saddle fitting; and
    inserting the one or more support member fasteners through the one or more openings in the saddle fitting and attaching the saddle fitting to the support member.

8. The method of claim 7, further comprising bonding the flange of the index fitting to the first face of the panel and bonding the back fitting to the second face of the panel.

9. The method of claim 7, further comprising preventing the index fitting from rotating within the opening in the panel.

10. The method of claim 7, further comprising positioning a top edge of the panel within the gap of the saddle fitting and positioning a bottom edge of the panel away from the saddle fitting.

11. The method of claim 7, further comprising contacting the outer side of the flange and the face of the boss of the index fitting against the saddle fitting and spacing the saddle fitting away from the back fitting.

12. The assembly of claim 1, wherein the boss comprises a circular sectional shape.

13. An assembly connecting a panel to a support member, the assembly comprising:
    a saddle fitting configured to be connected to the support member, the saddle fitting comprising first and second plates that are spaced apart by a gap that receives the panel;
    a back fitting positioned between the second plate of the saddle fitting and a second face of the panel, the back fitting shaped to extend around an opening in the panel, the back fitting further comprising an opening that aligns with the opening in the panel; and
    an index fitting comprising a flange positioned between the first plate of the saddle fitting and a first face of the panel, the index fitting further comprising a boss that extends outward from the flange and through the opening in the panel and the opening, in the back fitting, the boss comprising a face positioned outward beyond the second face of the panel, wherein the index fitting is wider than the panel and sized to fit within the gap of the saddle fitting without extending outward beyond inner surfaces of the first and second plates of the saddle fitting with an outer face of the flange of the index fitting facing away from the first face of the panel contacting against the inner surface of the first plate of the saddle fitting and the face of the boss of the index fitting contacting against the inner surface of the second plate of the saddle fitting,
wherein the saddle fitting comprises a body comprising, one or more openings to receive one or more support member fasteners to attach the saddle fitting to the support member, the first and second plates extending from the body.

14. The assembly of claim 13, wherein the flange of the index fitting is connected to the first face of the panel with an adhesive and the back fitting is connected to the second face of the panel with the adhesive.

15. The assembly of claim 13, wherein one or more fasteners extend through the index fitting and the saddle fitting and connect the saddle fitting to the index fitting, the fasteners comprise quick release pins with a head, an elongated shaft, and a spring loaded member that extends from the shaft.

16. The assembly of claim 13, further comprising one or more openings that extend through the boss and the flange of the index fitting with each of the one or more openings configured to receive one of the fasteners to connect the saddle fitting to the index fitting.

17. The assembly of claim 13, wherein the face of the boss is positioned farther outward away from the second face of the panel than an outer side of the back fitting.

18. The assembly of claim 13, wherein the boss comprises an elongated sectional shape with a major axis that is larger than and perpendicular to a smaller minor axis.

19. The assembly of claim 13, wherein the flange further comprises a cut-out along an outer edge, the cut-out sized to receive a fastener to orient the index fitting relative to the opening in the panel.

* * * * *